March 26, 1957 T. H. PRICE 2,786,903

TUNED THERMIONIC VALVE AMPLIFIERS

Filed Nov. 2, 1951 3 Sheets-Sheet 1

Inventor:
Thomas Henry Price;
By his attorneys,
Baldwin & Wight

March 26, 1957 T. H. PRICE 2,786,903

TUNED THERMIONIC VALVE AMPLIFIERS

Filed Nov. 2, 1951 3 Sheets-Sheet 2

Inventor:
Thomas Henry Price,
By his attorneys,
Baldwin & Wight

March 26, 1957 T. H. PRICE 2,786,903

TUNED THERMIONIC VALVE AMPLIFIERS

Filed Nov. 2, 1951 3 Sheets-Sheet 3

INVENTOR
THOMAS HENRY PRICE
By Baldwin & Wight
Attorneys

United States Patent Office 2,786,903

Patented Mar. 26, 1957

2,786,903

TUNED THERMIONIC VALVE AMPLIFIERS

Thomas Henry Price, Chelmsford, England, assignor to Marconi's Wireless Telegraph Company Limited, London, England, a British company Application November 2, 1951, Serial No. 254,568

Claims priority, application Great Britain November 6, 1950

6 Claims. (Cl. 179—171)

This invention relates to tuned thermionic valve amplifiers.

Since, as will be seen later, the invention provides tuned valve amplifiers whose circuits have points of marked resemblance to those of the well-known tuned push-pull amplifiers, it is convenient, in describing the invention, first to point out certain characteristics and defects of said known tuned push-pull amplifiers.

The invention is illustrated in and explained in connection with the accompanying diagrammatic drawings in which.

Figure 1:
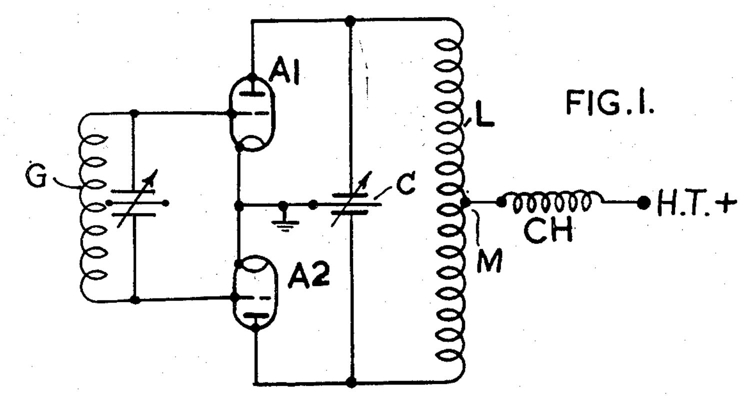
Figure 1 illustrates a typical push-pull amplifier circuit to which the circuit of my invention is applicable.

The simplest form of tuned push-pull amplifier consists, as shown in Fig. 1, of a pair of valves A1, A2 with a symmetrical tuned divided grid circuit G and a symmetrical tuned divided anode circuit, the latter consisting of inductance L and capacity C (including stray capacity) in parallel and being connected between the anodes of the valves, anode potential to which is supplied e. g. through a choke CH at the center point of said inductance. The grid alternating voltages VA1, VA2 are in phase opposition with respect to one another as also are the anode alternating voltages. This type of circuit is not satisfactory for use in cases in which the output power or voltage, which is coupled out from the common anode circuit, is required to be dependent upon the relative phase of the grid alternating voltages, and in practice of course, the maintenance of constant phase opposition relations as above described is sought. If the output power or voltage from the anode system were required to depend on the relative phase of the grid voltages the efficiency of performance of such a push-pull amplifier would be low.

Again, with a known push-pull amplifier as above described and illustrated in Fig. 1, the two general methods of varying the output level or amplitude (as is often required) are varying the grid input voltages in amplitude or varying the high tension voltage. The former expedient affects the electrical conversion efficiency which varies from a high to a low value depending upon the input level at any time, and the latter expedient involves the provision of complex and costly auxiliary equipment and may also involve a lower overall conversion efficiency.

A further defect or limitation of the known push-pull amplifier is that, where the grid inputs are of the phase modulated type the amplifier will not give outputs which are faithful phase copies of the inputs, as is sometimes required.

The present invention seeks to provide improved amplifiers which do not present the above mentioned defects and limitations of the known push-pull amplifiers and which can not only efficiently amplify phase opposition inputs but can also be used to amplify in-phase inputs, or inputs of any relative phase between these limits. The present invention provides improved amplifiers of a very wide range of usefulness which can be satisfactorily employed for many different purposes and under many different conditions (some of which will be detailed later herein), including some for which a normal push-pull amplifier is quite unsuitable.

According to this invention a thermionic valve circuit arrangement of the divided circuit type includes a pair of electron discharge electrode systems having cathode grid and anode elements and a tuned output circuit consisting of a divided portion and an undivided portion, the divided portion being connected between the anode elements of said electrode systems and the undivided portion being included between the mid-point of the divided portion and a return cathode connection for said electrode systems.

In the simplest embodiment of the invention the tuned output circuit comprises a parallel inductance-capacity (including or consisting of stray capacity) circuit connected between the output electrodes of the valves and a second inductance-capacity (including or consisting of stray capacity) circuit included between the mid-point of the first inductance-capacity circuit and the high tension return or equivalent terminal. Preferably the inductance in the second circuit is variable.

Figure 2:
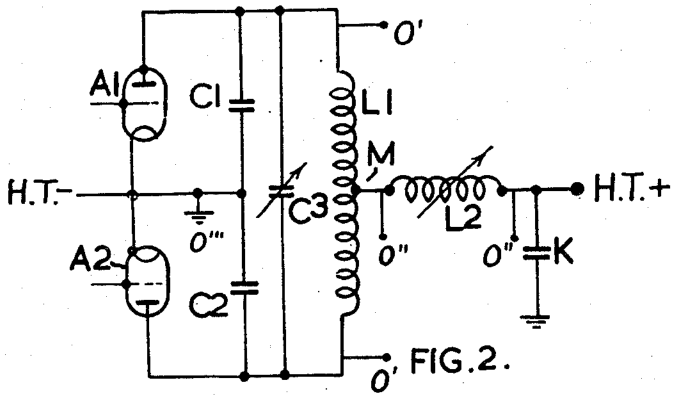
Fig. 2 illustrates one embodiment of my invention applied to a push-pull amplifier circuit.

In the embodiment of the invention represented in Fig. 2 two similar valves A1, A2 have their cathodes connected together and to the negative terminal HT— of the high tension source (the source is not shown but, in this embodiment, its negative terminal is presumed to be earthed as in the conventional way) and an input circuit (not shown) by which required appropriate voltages, in phase, phase opposed or of different phases as the case may be, are applied to the two control grids. For the sake of simplicity in description it will be assumed here, as in the later description, that separate triodes are employed, though the valves may be of any suitable type including so-called double valves, e. g. a double triode could be used. The anodes of the valves are connected together through a center-tapped coil L1 and each anode is connected to its associated cathode through a similar condenser C1 or C2 each of which may be adjustable and may constitute part of a condenser gang. Alternatively and as shown the condensers C1, C2 may be fixed and parallel resonance tuning of the push-pull circuit effected by another variable condenser C3 connected from one anode to the other. The mid-point M of the coil L1 is connected to HT+ through a variable inductance L2. A by-pass condenser K is connected between HT+ and earth.

This amplifier is tuned in two stages: first while the grids are well driven with voltages in phase opposition the tuning of the anode-to-anode circuit (i. e. the push-pull circuit) is varied until there is minimum anode current; then while the grids are well driven with voltages in phase, the variable inductance L2 is adjusted until minimum anode current results. The whole arrangement may be described, by extension of the normal term "push-pull" as a "push-pull-push" circuit, the inter-anode coil L1 with its shunt capacity acting in "push-pull" and the remainder of the tuned anode circuit acting in "push."

Figure 3:
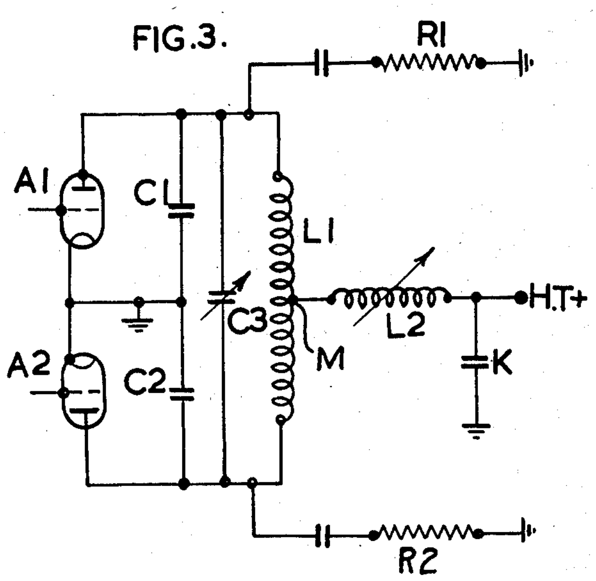
Fig. 3 shows a modified form of circuit embodying my invention and applied to a push-pull amplifier.
Figure 4:
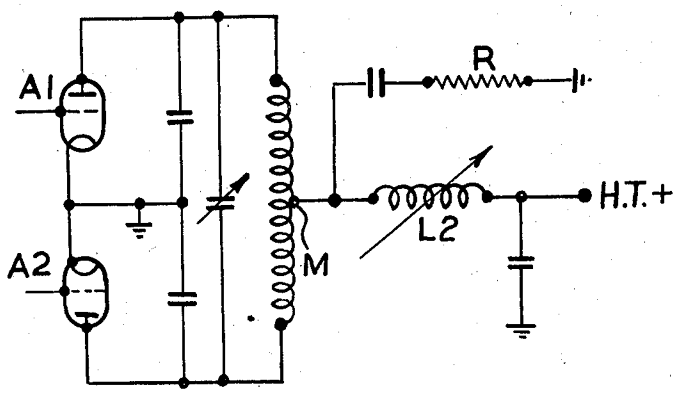
Fig. 4 illustrates a circuit arrangement embodying my invention in which the output of the push-pull amplifier is dependent upon the instantaneous relative phase between the inputs to the tube grids of the push-pull circuit.

Output may be taken from the system in any of a variety of different ways: from across the push-pull circuit (i. e. from across the inter-anode coil L1, terminals O′ O′); from across the "push" circuit (i. e. from across the adjustable inductance L2, terminals O″ O″); from across both these circuits together, i. e. from terminals O′ O′ and O″ O″; or from between each of the two anodes O′ and earth O‴ or HT—. In Fig. 3 the last mentioned of these possibilities is illustrated, the output loads being represented by the resistances R1 and R2. This arrangement may be and is herein termed "side loading." Fig. 4 illustrates the case where what is herein termed "center loading" is employed, the output load being represented by the resistance R.

If either or both grid input voltages be phase modulated, correspondingly phase modulated amplified output may be obtained from across resistances connected as output resistances in the varying ways above set forth and, in short, the arrangement can be used to produce amplified replicas of phase modulated, amplitude modulated or phase and amplitude modulated inputs. If the grids be well driven with phase modulated voltages which may include also amplitude modulation (e. g. undesired, accidental amplitude modulation in a phase modulated communication system) and the valves are operated in the class C condition, output taken from between each of the two anodes and earth or HT— will be substantially constant in amplitude and bear practically only the phase modulation in the grid input.

The arrangement may also be used to give an output of amplitude dependent upon the instantaneous relative phase between the inputs to the two grids. This result may be achieved by a circuit as illustrated in Fig. 4 in which an output resistance R is connected across the adjustable inductance L2 when, provided the voltage inputs to the grids are adequate, the output voltages across the resistance R and therefore the current through it will be of instantaneous amplitude substantially proportional to the cosine of half the instantaneous phase angle between the grid inputs. Such an arrangement may be used for example to convert phase modulation to amplitude modulation and good linearity of conversion can be obtained the linearity depending in part upon the range of phase modulation of the input. One advantage of this arrangement is that the load presented to the valves is substantially resistive for all relative phase angles of input so that a high conversion efficiency for all relative phase angles is obtained. An amplitude modulation demodulator may be connected across or in place of the output resistance of this arrangement and the demodulated output employed to drive other equipment or actuate a meter. If desired, such a meter can be arranged to give a predetermined reading when the voltages applied to the grid of the valves are in phase and can be calibrated to indicate directly the phase angle between the grid inputs.

An output amplitude dependent on the relative phase between the grid inputs can be obtained by suitable circuits connected between the two anodes instead of taking the output from across the variable inductance.

When a "push-pull-push" amplifier in accordance with this invention is employed, to produce an output amplitude dependent on the relative phase between the grid inputs, the load conditions for the two valves will most nearly approximate to resistive if the push-pull coil between the two anodes is arranged with the two halves, one each side of the center tap M, as closely coupled as possible i. e. with the highest achievable mutual inductance. It is therefore preferred in such cases, to sectionalize the windings of the half coils and interleave the the sections or to adopt other expedients, well known per se for closely coupling the two half coils.

In the foregoing particular description the "push" circuit has been described as comprising a variable inductance. This has been done to facilitate identification of this inductance which has been referred to as the "variable inductance." Obviously it need not be variable. The "push" circuit, in conjunction with the "push-pull" circuit has merely to present, as a whole combination, a circuit in parallel resonance and clearly a fixed coil could be used in the "push" circuit and variable tuning obtained, if required, by a variable condenser connected across it.

Figure 5:
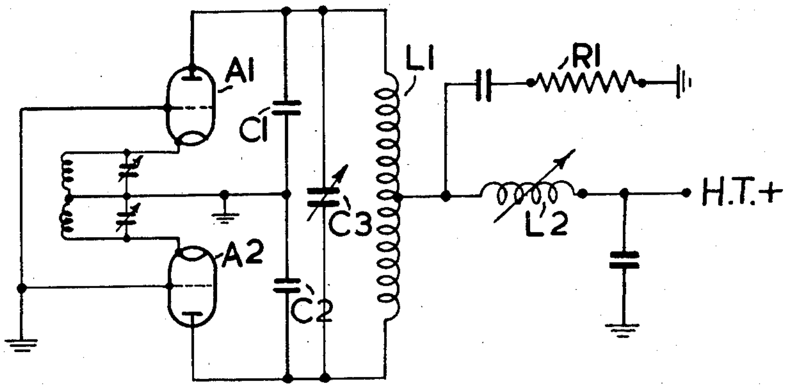
Fig. 5 illustrates one form of circuit of my invention applied to a grounded grid push-pull amplifier circuit.
Figure 6:
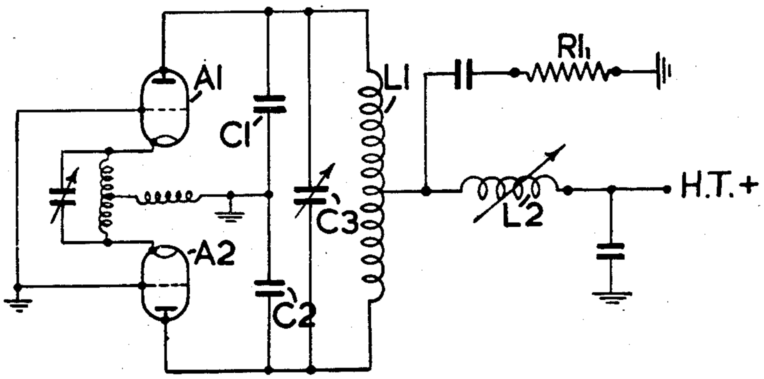
Fig. 6 shows the application of my invention to a push-pull amplifier circuit having the push circuit connected at the midpoint of the push-pull amplifier circuit.

Amplifiers in accordance with this invention may be of the grounded grid type that is to say the valves thereof may have their cathodes driven and the grids earthed. Such a grounded grid amplifier may have separate parallel resonant circuits between each cathode and earth as shown in Fig. 5 or it may have a three terminal T circuit like that already described for the anodes (i. e. a "push-pull" circuit with a "push" circuit at its mid-point connected between its cathodes and earth as shown in Fig. 6. In view of the description already given, Figs. 5 and 6 will, it is thought, be found self-explanatory.

Figure 7:
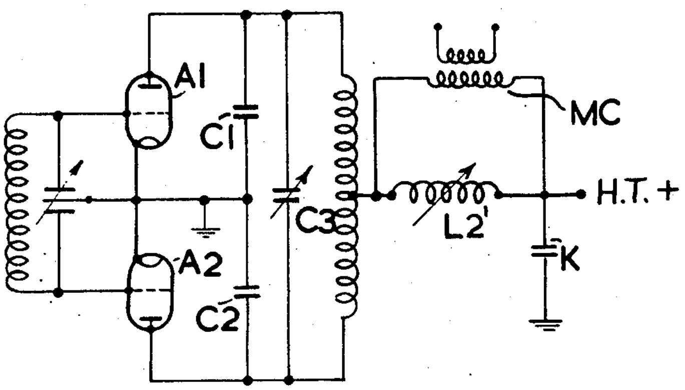
Fig. 7 shows the application of my invention to a push-pull amplifier circuit which is driven with phase opposed excitation of its two grids and with voltage in quadrature with the grid voltages.

An amplifier in accordance with this invention may readily be modified to act as a phase modulator giving two phase modulated outputs one from between one anode and cathode and the other from between the other anode and cathode. Thus if as shown in Fig. 7, the circuit of Fig. 4 is driven with phase opposed excitation of its two grids and the load circuit across the "push" circuit is replaced by a transformer across said "push" circuit to which is applied from an external source a voltage of suitable varying (modulating) amplitude and in quadrature with the grid voltages, phase modulated voltages will appear between each anode and cathode. The output transformer MC delivers the amplified output for any desired application.

Amplifiers in accordance with this invention may be used in cascade with one another or with known amplifiers.

Wherever in the claims I refer to "divided" circuits I refer to an intermediately tapped circuit and wherever I refer to an "undivided" circuit I mean a circuit which is not tapped. The center tapped tuned push-pull output circuit disclosed herein is a divided circuit and the parallel tuned output circuit is an undivided circuit.

In the operation of the amplifier system of my invention the parallel tuned circuit is resonated as a push-pull circuit for phase opposition inputs, while the undivided portion of the tuned circuit is resonated in conjunction with the two halves of the divided portion as a tuned circuit for inphase inputs.

While I have described certain preferred embodiments of my invention I realize that modifications may be made, and I desire that it be understood that no limitations upon my invention are intended other than may be imposed by the scope of the appended claims.

I claim:

1. A tuned thermionic valve circuit arrangement of the divided circuit type comprising a pair of electron discharge electrode systems each including input electrodes and output electrodes, a tuned output circuit consisting of a divided portion, an undivided portion and a high tension return path connected with said divided portion, said divided portion being connected between two output electrodes of said systems which are at opposing potentials and tuned as a push-pull resonance circuit to give minimum output current for phase opposed input voltages of working frequency applied to the input electrodes of said pair of systems and the undivided portion being included between the mid-point of the divided portion and the high tension return path and tuned in conjunction with the two halves of the divided portion on the two sides of said mid-point as a push-push resonance circuit to give minimum output current for in-phase input voltages of the same working frequency applied to said pair of systems.

2. A tuned thermionic valve circuit arrangement as set forth in claim 1, wherein the tuned output circuit comprises a parallel inductance-capacity circuit connected between said output electrodes of the valves and a second inductance capacity circuit the inductance of which is included between the mid-point of the first inductance-capacity circuit and the high tension return path.

3. A tuned thermionic valve circuit arrangement as set forth in claim 1, wherein the circuit output is taken from across the portion of the circuit between said output electrodes.

4. A tuned thermionic valve circuit arrangement as set forth in claim 1, wherein output is taken from across the portion of the circuit between the high tension return path and the mid-point of the portion of the circuit between said output electrodes.

5. A tuned thermionic valve circuit arrangement as set forth in claim 1, wherein output is taken from across the portion of the circuit between the high tension return path and each of said output electrodes of the two systems.

6. A tuned thermionic valve circuit arrangement of the divided circuit type comprising a pair of electron discharge electrode systems having input and output electrodes and a high tension return path and a tuned output circuit consisting of a divided portion and an undivided portion, the divided portion being connected between two output electrodes of said systems which are at opposing potentials and including two halves of an inductance tuned as a push-pull resonance circuit to give minimum output current for phase opposed input voltage of working frequency applied to said pair of systems and the undivided portion being included between the mid-point of the divided portion and the high tension return path and tuned in conjunction with the two halves of the divided portion on the two sides of said mid-point as a push-push resonance circuit to give minimum output current for in-phase input voltages of the same working frequency applied to said pair of systems, the two halves of the inductance in the divided portion of the output circuit having high mutual inductance.

References Cited in the file of this patent

UNITED STATES PATENTS

| | | |
|---|---|---|
| 2,253,942 | Rath | Aug. 26, 1941 |
| 2,284,181 | Usselman | May 26, 1942 |
| 2,393,709 | Romander | Jan. 29, 1946 |
| 2,540,817 | Forster | Feb. 6, 1951 |
| 2,543,973 | Jensen | Mar. 6, 1951 |

FOREIGN PATENTS

| | | |
|---|---|---|
| 852,645 | France | Feb. 28, 1940 |